Figure 1:
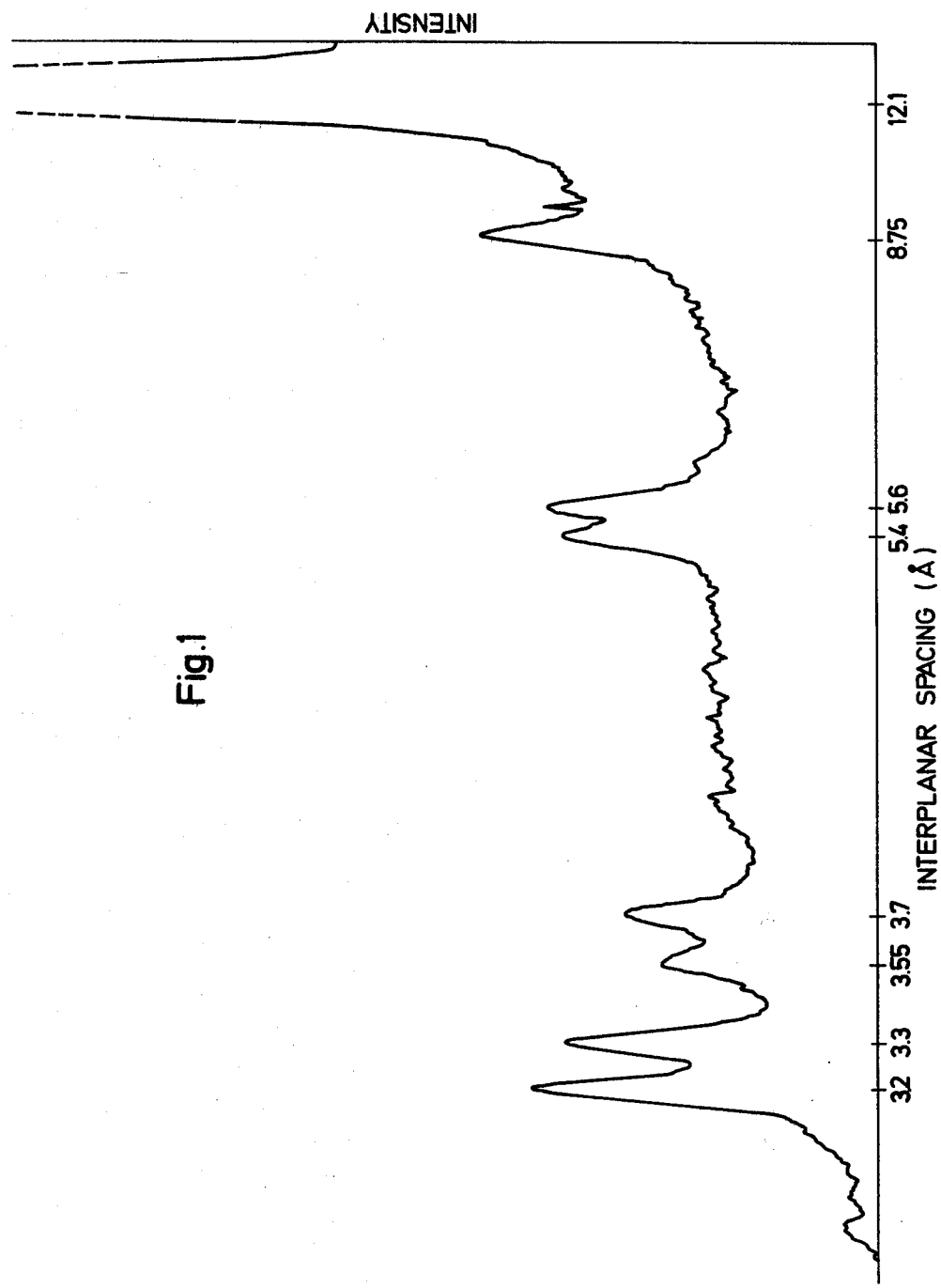

United States Patent [19]

Wheeler

[11] 4,171,309
[45] Oct. 16, 1979

[54] PROCESS FOR THE PREPARATION OF A SOLVENT-STABLE, RED-SHADE COPPER PHTHALOCYANINE PIGMENT COMPOSITION

[75] Inventor: Ian R. Wheeler, Craigend, Scotland

[73] Assignee: Ciba-Geigy Corporation, Ardsley, N.Y.

[21] Appl. No.: 875,844

[22] Filed: Feb. 7, 1978

[30] Foreign Application Priority Data

Feb. 17, 1977 [GB] United Kingdom ............... 6591/77

[51] Int. Cl.$^2$ ..................... C09B 47/06; C09B 67/00
[52] U.S. Cl. ............................ 260/314.5; 106/288 Q; 106/292; 106/302; 106/304; 106/300
[58] Field of Search ................. 106/288 Q; 260/314.5

[56] References Cited

U.S. PATENT DOCUMENTS 3,775,423  11/1973  Lamure ........................... 260/314.5

FOREIGN PATENT DOCUMENTS 40-4144  3/1965  Japan ................................. 260/314.5

*Primary Examiner*—Helen McCarthy
*Attorney, Agent, or Firm*—Joseph F. DiPrima

[57] ABSTRACT

A process for the preparation of a solvent-stable, red shade copper phthalocyanine pigment composition by reacting an organic compound capable of forming the phthalocyanine ring system, benzophenone 3,3',4,4'-tetracarboxylic acid or a derivative thereof, a copper compound capable of providing the copper atom of the copper phthalocyanine molecule, a reaction catalyst, and a nitrogen source, optionally in the presence of at least one phthalocyanine compound substituted by 1 to 4 groups of a sulphonate or sulphonic acid and/or sulphonamide which may be N-substituted.

6 Claims, 4 Drawing Figures

PROCESS FOR THE PREPARATION OF A SOLVENT-STABLE, RED-SHADE COPPER PHTHALOCYANINE PIGMENT COMPOSITION

This invention relates to a single stage process for the preparation of pigment compositions, in particular of solvent stable red shade copper phthalocyanine pigment compositions, which are in a condition suitable for use as pigments.

Copper phthalocyanine pigments, which are characterised by bright hues and excellent resistance to heat, light and chemical degradation, are known to exist in a number of crystal forms which differ greatly from each other in both physical and tinctorial properties. Of these forms, the so-called α- and β-modifications have been most widely used as pigments. In relation to tinctorial properties, α-copper phthalocyanine exhibits red shade blue pigmentations in surface coating binders whereas the β- modification exhibits green-shade blue pigmentations in such substrates. Unfortunately, however, the α-form is also characterised by the tendency to revert to the more stable β-form with an accompanying change of shade, especially when in contact with the aromatic solvents used in many surface coating media. This problem has been overcome by a number of means such as the incorporation of a small amount of chlorine into the molecule, or the use of copper phthalocyanine derivatives as additives on performed copper phthalocyanine to inhibit crystal transformation.

In general, production of copper phthalocyanines has been carried out by the so-called urea or nitrile processes wherein the pigment is produced by the following respective processes:

(A) Reaction of a mixture of phthalic acid or anhydride, urea, a copper salt and a reaction catalyst at 170°–250° C., optionally in an inert, high boiling point aromatic solvent;

(B) Reaction of phthalonitrile and copper or a copper salt at high temperature, optionally in an inert, high boiling point solvent.

From these reactions there are obtained crude copper phthalocyanines of the β-modification composed of particles so large as to be unfit for use as pigments. Accordingly, such products must be conditioned to reduce their particle size to pigmentary, viz. sub-micron size. A large number of methods have been described for effecting such conditioning; those methods differing according to the crystal form of copper phthalocyanine that it is desired to produce.

For production of the α-form of copper phthalocyanine, the best known method is that of dissolving the crude β form copper phthalocyanine in 10–15 times its weight of concentrated sulphuric acid. The solution is subsequently poured into a bulk of water under controlled conditions thereby reprecipitating pigmentary copper phthalocyanine in the α-form.

While such pigmentization treatment with concentrated sulphuric acid affords strong, clean, red-shade blue pigments, the process, known as acid pasting, has a number of serious disadvantages:

(1) A large quantity of concentrated sulphuric acid, some 10–15 times the weight of copper phthalocyanine, is used, leading to low throughput and low efficiency.

(2) Concentrated acid must be handled with care, and special plant is required to prevent corrosion, and the possible contamination of the pigment.

(3) Removal of acid from the reprecipitated pigment is slow and tedious.

(4) Disposal of large volumes of waste acid creates a serious pollution problem.

As an alternative to acid pasting with sulphuric acid, conditioning of crude copper phthalocyanine to yield pigmentary α-form copper phthalocyanine may be achieved by salt milling. Such a comminution process must be regarded as a very disadvantageous process for industrial purposes since its operation by the impact of steel balls in a rotating mill requires a large amount of power over long periods if the significant proportions of green-shade β-form copper phthalocyanine are to be eliminated. The process is also inefficient, as up to 75% of the mill charge may require to be composed of inorganic salts to improve grinding efficiency. In consequence, the amount of copper phthalocyanine processed per batch is small. After grinding, the inorganic salts must be separated from the pigment, for example, by a further stage of aqueous washing.

From the foregoing, it is clear that conventional methods for the production of pigmentary α-form copper phthalocyanine involve two steps: the synthesis of crude copper phthalocyanine, and its subsequent conditioning. Several techniques have been reported in which these steps are combined but as a conditioning step is still required, none can be regarded as completely satisfactory.

In contrast to the foregoing, we have found, surprisingly, that solvent stable, red shade copper phthalocyanine pigment compositions in many instances at least in a form resembling the α-crystal form of copper phthalocyanine, may be obtained by a single stage reaction, in a condition suitable for use as a pigment, by performing the synthesis of copper phthalocyanine by the so-called "phthalic anhydride-urea process" in the presence of an organic compound capable of forming the phthalocyanine ring system and of a small amount of benzophenone 3,3',4,4'-tetra carboxylic acid or derivatives thereof and optionally in the presence of specific phthalocyanine derivatives as hereinafter defined.

Accordingly, the present invention provides a process for the preparation of a solvent-stable, red-shade copper phthalocyanine pigment composition, comprising reacting, at an elevated temperature and in an organic solvent, an organic compound capable of forming the phthalocyanine ring system, benzophenone 3,3',4,4'-tetracarboxylic acid or a derivative thereof, a copper compound capable of providing the copper atom of the copper phthalo cyanine molecule, a reaction catalyst, and a nitrogen source, optionally and preferably in the presence of one or more of the compounds of the formula:

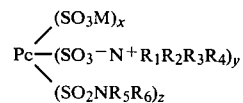

wherein Pc represents a metal or metal-free phthalocyanine residue, preferably a transition metal phthalocyanine residue, $R_1$, $R_2$, $R_3$, $R_4$, $R_5$ and $R_6$ are the same or different, and each represents a hydrogen atom, a cyclic or acylic alkyl group, an aryl, aralkyl, alkaryl or dehydroabietyl group, M represents hydrogen or an alkali metal atom, x, y and z can each be in the range of from 0 to 4, with the proviso that the sum of x, y and z is within the range of from 1 to 4. Pc preferably represents a phthalocyanine residue containing a first series transition metal viz. Ti, V, Cr, Mn, Fe, Co, Ni, Zn or, especially, Cu.

In relation to the compounds of formula I, the alkyl, cycloalkyl, aryl, aralkyl or alkaryl groups $R_1$ to $R_6$ may be interrupted by hetero atoms such as O, N or S and may be substituted by hydroxyl, amino or amide groups.

As a further aspect, there is provided a solvent-stable, red-shade pigment composition when produced by this process.

In many cases at least, the products of the process of the invention exhibit an X-ray diffraction spectrum resembling the α-modification of copper phthalocyanine.

In a further aspect, the present invention also provides a pigment composition comprising 80–100% copper phthalocyanine containing linkages derived from the use of 2.5–10% w/w of benzophenone-3,3',4,4'-tetracarboxylic acid or a derivative thereof in the phthalocyanine ring forming component of the reaction, and 20–0% w/w of a compound of formula I as hereinbefore defined, or a derivative thereof, for example a derivative of the compound of formula I as present in the product of the process of the invention.

Due to the method of preparation of compounds of formula I, namely by reaction of a phthalocyanine with oleum or chlorosulphonic acid, optionally followed by thionyl chloride, and subsequent treatment with an amine or mixture of amines, mixtures of compounds of formula I, having varying degrees of substitution are produced. Analysis of such mixtures thereof can establish fractional values for x, y and z. Suitable compounds of formula I are those wherein x has a value in the range 0 to 2, and z and y each have a value in the range 0 to 3, subject to the proviso hereinbefore described.

Although the use of compounds of formula I in the process of the invention is not essential it is a further advantage of the process of the invention that when present in the reaction mixture, the compounds of formula I appear to improve the rheological and colouristic properties of the resulting pigment compositions in application media in a similar manner to that described in our British patent applications, Nos. 37106/75, 18736/76 and in British patent specification No. 1,263,684.

Moreover, whereas the product of a conventional copper phthalocyanine reaction is in the form of non-pigmentary crystals having a particle size range of 40–100μ, the products of the present invention, surprisingly, are substantially of sub-micron dimensions. Consequently, the products of the process of the invention, without further conditioning, may be incorporated in a variety of surface coating media, wherein they display excellent strength and flow. Furthermore, the process of the present invention gives rise to pigment compositions of excellent stability to organic solvents, such as xylene and toluene, which are normally capable of converting the α-form of copper phthalocyanine to the β-form. Indeed, the pigment compositions of the invention are essentially unchanged in crystal size and modification by prolonged boiling in such solvents.

Copper phthalocyanine pigments of pure or substantially pure α-modification may be differentiated from the other known forms, and from mixtures of these various modifications not only by shade but especially by means of X-ray diffraction spectra. The spectrum of the α-form contained in FIG. 1 of the accompanying drawings, is that of a copper phthalocyanine pigment prepared by acid pasting of crude β-form copper phthalocyanine as hereinbefore described. Further spectra shown in the accompanying drawings are produced from the products of the invention prepared as described in the Examples.

Suitable organic compounds capable of forming the phthalocyanine ring system are, for example, phthalonitrile, phthalamic acid, phthalimide, phthalic acid, phthalic anhydride and 2-cyano benzoic acid, though phthalic acid or anhydride are preferred.

Suitable benzophenone derivatives are benzophenone-3,3',4,4'-tetracarbocylic acid or alkali metal salt thereof, anhydride, imide, di-imide, mono-, di-, tri- or tetra-amide, but benzophenone 3,3',4,4'-tetracarboxylic dianhydride is preferred.

The total phthalocyanine ring forming compound comprises 90–97.5% w/w, preferably 92–96% w/w of the aforementioned phthalocyanine ring forming compounds and 10–2.5% w/w, preferably 8–4% w/w of the aforementioned benzophenone derivative.

Among copper salts capable of providing the central copper atom of the copper phthalocyanine molecule there may be mentioned anhydrous cupric sulphate, anhydrous cupric acetate and anhydrous cuprous chloride, but anhydrous cupric chloride is preferred. 0.90–1.10 moles of copper salt for every 4 equivalents of total phthalocyanine ring forming compound gives satisfactory results.

Urea is preferred as a source of nitrogen on account of its low cost and commercial availability. A satisfactory level of urea is 15–20 moles for every 4 moles of the phthalocyanine ring-forming compound.

Catalysts suitable for the operation of the process are those previously described in the literature as suitable for phthalocyanine synthesis. Compounds of molybdenum, especially ammonium molybdate or molybdic oxide are preferred as they have been found to give high yields of copper phthalocyanine. A concentration of 0.01 to 0.03 moles for every 4 moles of the phthalocyanine ring-forming compound is generally suitable.

Suitable solvents for use in the process of the invention are those boiling above 150° C., optionally substituted aliphatic or aromatic hydrocarbons boiling above 150° C. Examples of such solvents are kerosene, decalin (decahydronaphthalene), dodecylbenzene, isoparaffins e.g. the commercially-available "Isopars"(Esso), the isomeric dichloro- and trichlorobenzenes, nitrobenzene and the isomeric halogenated nitrobenzenes and nitrotoluenes. Those solvents such as p-nitrotoluene which are solids at room temperature may be heated to their melting points in the presence of the remaining reagents, prior to commencing agitation of the reaction mixture. The preferred solvent is nitrobenzene.

Although the quantity of solvent employed in the reaction is not critical, it is usual to use only sufficient organic solvent to ensure a stirrable reaction mass; too much solvent is wasteful and tends to reduce the rate of reaction. A level of 2 to 10 moles per 4 moles of phthalocyanine ring-forming compound is generally found satisfactory.

Where it is used, a level of 1%–20% w/w of the compound of formula I, based on total pigment composition, has been found satisfactory, though 5–15% w/w is preferred. Too low a level may not provide the aforementioned improvements in applicational properties, whilst too high a level is wasteful of additive and is moreover expensive.

The process of the invention may be carried out in any stirred vessel commonly employed for the preparation of phthalocyanines and capable of operation at temperatures from 160° to 220° C., preferably 170°–180° C. It is found convenient to charge all reagents cold to the vessel. With stirring the temperature may be raised cautiously through 100° C., where evolution of volatile material takes place, to the preferred range of 170°–180° C. At such a temperature, reaction is essentially complete in 6–10 hours, though the yield may be maximised by reacting for up to 18 hours.

Alternatively, the reaction may be carried out at higher temperatures for shorter times. A temperature of 200° C. for 3½ hours has been found satisfactory, giving high yields of the copper phthalocyanine composition. Although the compound of formula I is conveniently added at the start of the reaction, it may be added at any time during the heating stage at which the temperature of the reaction is less than 120° C.

The red-shade copper phthalocyanine product may be separated from the reaction mixture by any of the methods previously known; for example by removal of the solvent by steam distillation under alkaline conditions followed by hot filtration and washing with hot water. If desired, further by-products of the reaction may be removed by stirring the presscake so obtained in hot aqueous mineral acid, filtering hot, washing with hot water and drying at 50°–55° C.

Alternatively the pigment product may be recovered by dilution by an oxygen-containing solvent such as methanol, filtering and washing with further methanol and drying. A further alternative is simply filtration of reaction product and washing with solvent, e.g. methanol. While red-shade copper phthalocyanine pigments obtained according to the present invention are suitable for use as pigments without further conditioning stages, they may, if desired, be optimised in their applicational properties by conventional techniques. Such techniques include short milling cycles in a ball-mill or bead mill, alone or in the presence of a solvent and/or inorganic salts. Alternatively solvent treatment e.g. in accordance with British patent specification No. 1,140,836, or the addition of rosin or an aliphatic amine having from 12 to 22 carbon atoms.

A still further aspect of the present invention concerns a composition comprising an organic material and a pigmenting proportion of a pigment composition according to the present invention; and also a method of pigmenting organic material comprising incorporating therein a pigmenting proportion of the pigment composition of the invention.

The proportion of the pigment composition in the organic material is normally within the range from 0.1% to 30% by weight, based on the weight of the organic material.

Organic materials which may be coloured according to the invention include high molecular weight organic material, e.g. cellulose ethers and cellulose esters such as ethyl cellulose, acetylcellulose and nitrocellulose, polyamides, polyurethanes and polyesters, natural and synthetic resins such as aminoplasts, especially urea-formaldehyde and melamine-formaldehyde resins, alkyd resins, phenoplasts, polycarbonates, polyolefins such as polystyrene, polyvinyl chloride, polyethylene, polypropylene, polyacrylonitrile, polyacrylic acid esters, rubber, casein, silicone and silicone resins, individually or in admixture. It does not matter whether these high molecular weight compounds are in the form of plastic masses or melts or in the form of spinning solutions.

The pigment compositions of the invention are of particular interest however for the colouration of lacquers, paints and printing inks, especially solvent-based decorative and industrial paints and packaging inks.

The pigment compositions of the invention are characterized by redness of shade, excellent strength, flow and solvent stability.

The following Examples further illustrate the present invention. Parts and percentages shown therein are by weight.

EXAMPLE 1

94.1 parts phthalic anhydride, 4.3 parts benzophenone 3,3',4,4'-tetracarboxylic dianhydride (Gulf Chemical Co.). 22.5 parts anhydrous cuprous chloride, 0.76 parts molybdic oxide, 175 parts urea and 300 parts nitrobenzene were stirred together in a vessel fitted with an air condenser. With stirring, the temperature was raised to 170° C. over 5 hours, with a slow heating stage of 2½ hours between 95° C. and 110° C. to allow the smooth evolution of volatile material.

The temperature was maintained at 170° C., with stirring, for 16 hours, after which the reaction mixture was discharged into a second vessel containing 35 parts potassium hydroxide in 235 parts water. The nitrobenzene was removed by steam distillation and the residue filtered hot, and washed with hot water.

The presscake so obtained was reslurried in a solution of 50 parts concentrated hydrochloric acid in 250 parts water, stirred for 2 hours at 95° C., then filtered hot, washed acid free with hot water and dried in an oven at 55° C.

Figure 2:
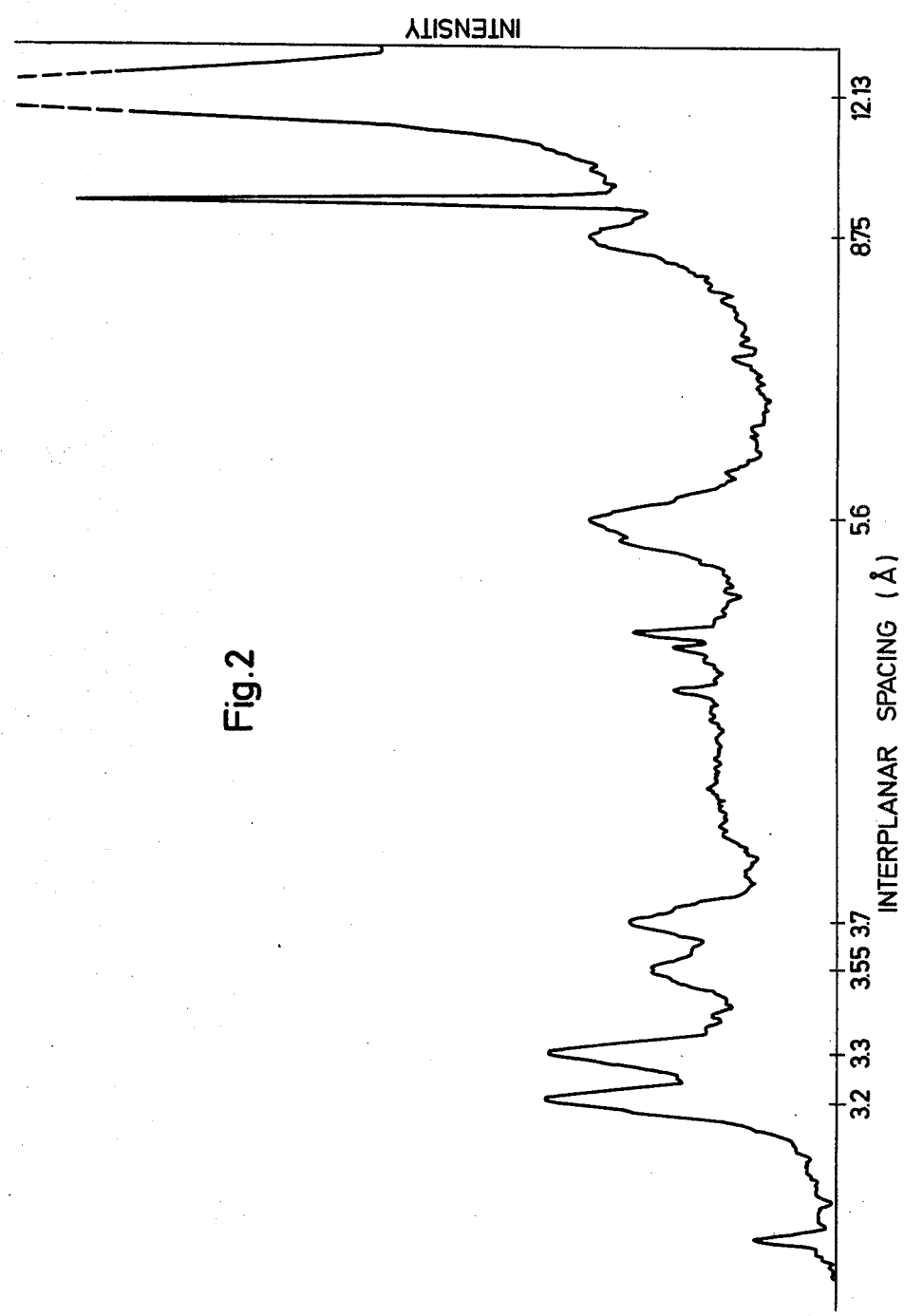

There were obtained 85.8 parts of a pigment composition having the x-ray diffraction spectrum shown in FIG. 2, and, typically, a particle size range, calculated from electron micrographs of 0.2–0.7μ.

The x-ray diffraction spectrum of the pigment composition was unchanged by refluxing the pigment composition for 2 hours, in fifty times its own weight of toluene: neither could any evidence of crystal growth be detected as a result of such treatment.

The pigment composition of this Example, without any conditioning treatment to further reduce its particle size, was incorporated in a lithographic varnish on a Muller dispersing machine. When drawn down on white card, the ink was of similar strength and shade to a similar ink film derived from an α-form copper phthalocyanine pigment prepared by grinding of monochlorinated copper phthalocyanine.

If the synthesis stage of this Example is repeated in the absence of the benzophenone derivative, there is obtained a copper phthalocyanine of the β-crystal form having a particle size of 50–60μ. Such a product is unsuitable for use as a pigment.

EXAMPLE 2

The method of Example 1 was repeated with the addition to the reagents listed therein of 9.5 parts of the compound of average formula:

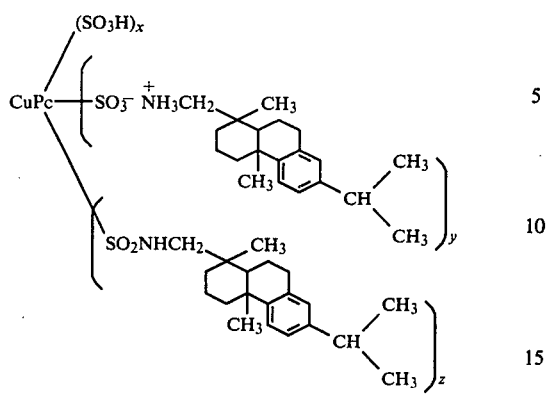

wherein x=0.5, and y+z=2.

Figure 3:
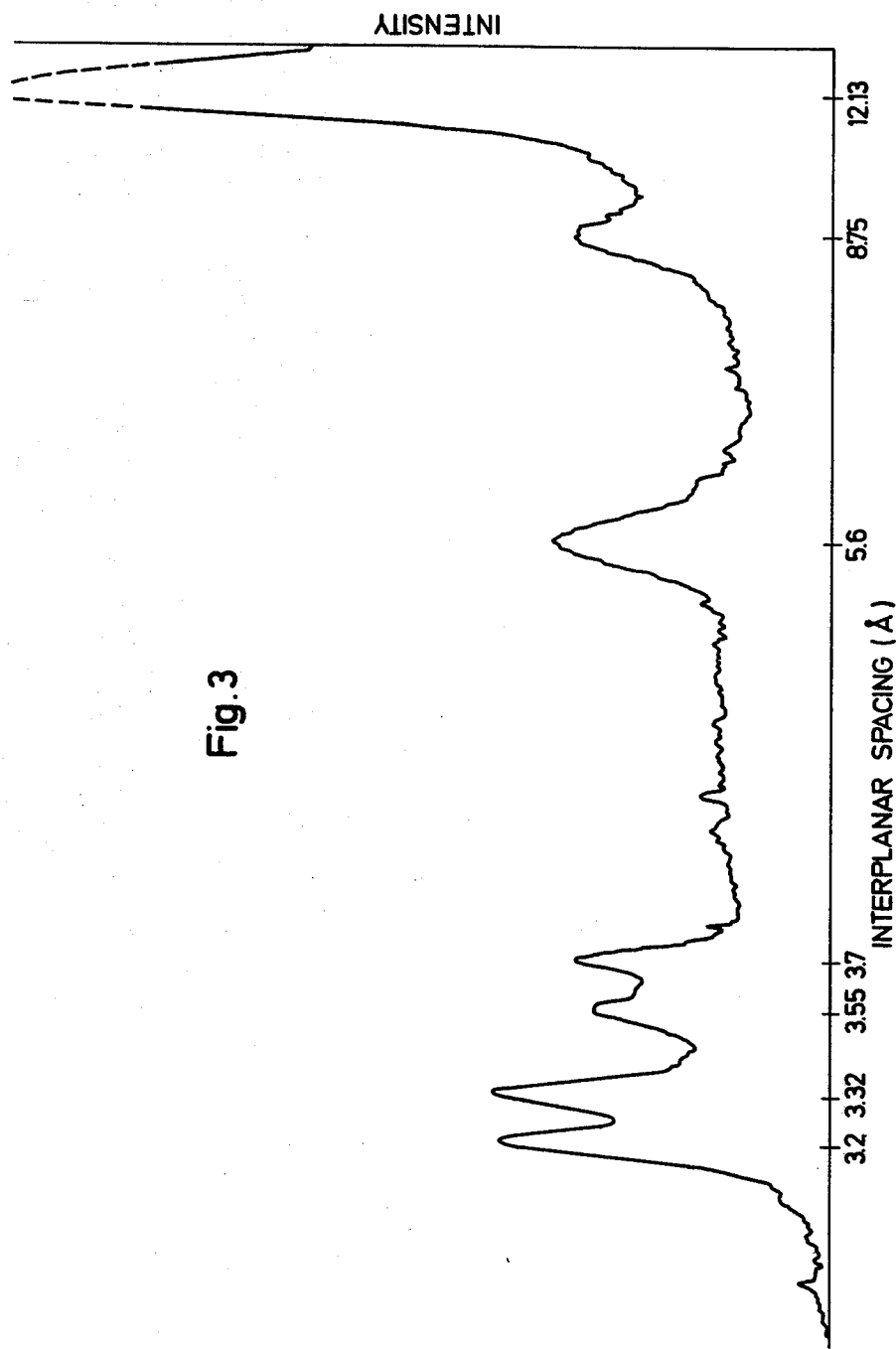

There were obtained 98.7 parts of a pigment composition having an x-ray diffraction spectrum (FIG. 3), corresponding closely to that characterising the α-crystal form of copper phthalocyanine, and, typically, a particle size range calculated from electron micrographs of 0.2–0.5μ.

Figure 4:
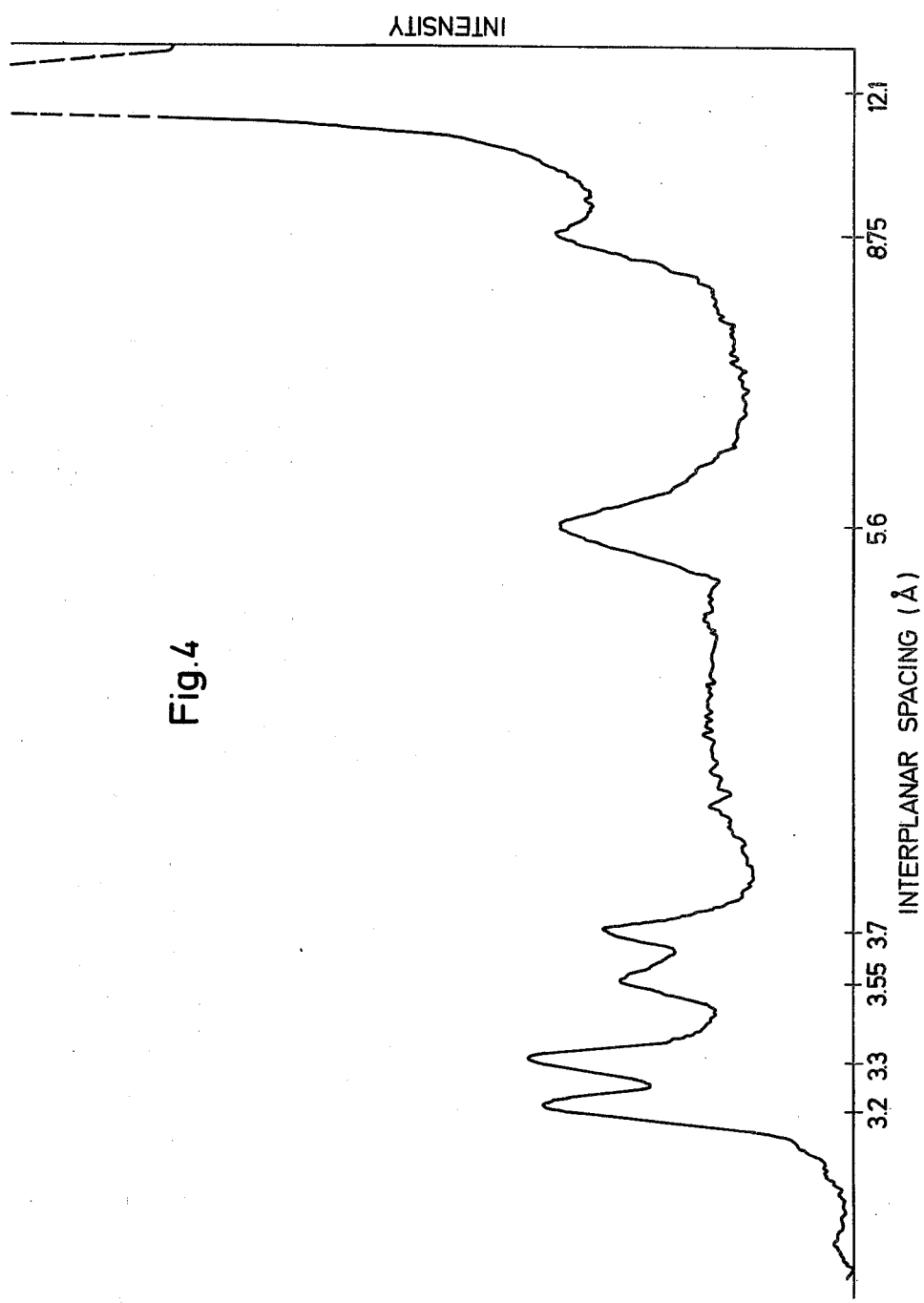

The crystal modification of the pigment composition, as denoted by its X-ray spectrum was unchanged by a 2 hour reflux in toluene (FIG. 4). No evidence of crystal growth could be detected by either X-ray diffraction or electron microscopy, however the surface area as measured by nitrogen adsorption (B.E.T. method) rose from 87 m²/g. to 127 m²/g., as a result of such solvent treatment.

The pigment composition of this Example, without further conditioning, was incorporated in an alkyd-melamine paint medium by ballmilling. When sprayed onto a metal panel, the paint film was of similar strength but of a slightly greener shade than a similar paint film derived from an α-form copper phthalocyanine pigment prepared by acid pasting.

EXAMPLE 3

Example 1 was repeated with the use of 105.5 parts of phthalic acid in place of phthalic anhydride, and with the addition of 10 parts of the compound of average formula:

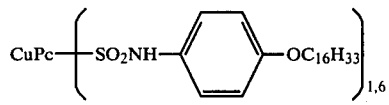

prepared by reaction of crude copper phthalocyanine with chlorosulphonic acid followed by thionyl chloride, and subsequently treating with p-cetyloxyaniline.

There were obtained 96.3 parts of a pigment composition which displayed a strong red shade when dispersed in a decorative alkyd paint system by bead milling.

EXAMPLE 4

90.1 parts phthalic anhydride, 8.5 parts benzophenone 3,3′,4,4′-tetracarboxylic dianhydride, 22.5 parts cupric chloride, 0.5 parts ammonium molybdate, 180 parts urea, 1.5 parts sulphonated castor oil, and 300 parts kerosene were reacted together and the product recovered and purified by the method of Example 1, to give a product having applicational properties similar to those of the product of Example 1.

EXAMPLE 5

Example 1 was repeated with the addition to the reagents listed therein of 10 parts of the compound of average formula

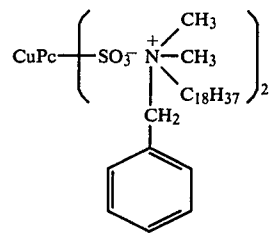

prepared by reaction of copper phthalocyanine disulphonic acid with the commercially available quaternary ammonium chloride Kemamine BQ9702C, (Humko Chemical Products).

The application properties of this product were similar to those of the product of Example 3 when dispersed in decorative alkyd paint by bead milling.

Similar results may also be obtained by the use of the compound of average formula

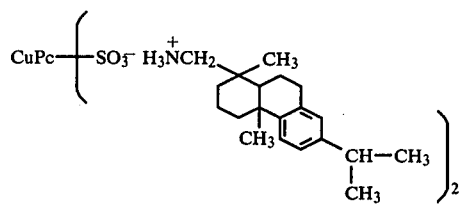

prepared by reaction of copper phthalocyanine disulphonic acid with commercial abietylamine (Rosin Amine D; Hercules Powder Co.).

EXAMPLE 6

93.3 parts phthalimide, 4.3 parts benzophenone 3,3′,4,4′-tetracarboxylic dianhydride, 16.5 parts cuprous chloride, 0.8 parts ammonium molybdate, 175 parts urea and 300 parts decahydronaphthalene were heated cautiously to 110° C. with stirring. 10 parts of the additive of Example 2 were added and the mixture stirred at 180° C. for 13 hours. The pigment composition recovered in a yield of 92 parts by alkaline steam distillation was purified by hot aqueous acid treatment. The product had an X-ray diffraction pattern similar to the material from Example 2.

EXAMPLE 7

The method of Example 1 was repeated with the addition to the reagents listed therein of 9.5 parts of the compound of average formula

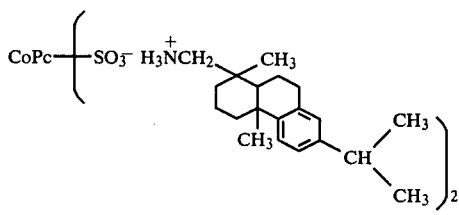

where Co represents Cobalt. A product of X-ray diffraction pattern similar to the α-form of phthalocyanine was obtained.

EXAMPLE 8

The method of Example 1 was repeated with the addition to the reagents listed therein of 9 parts of the compound of formula

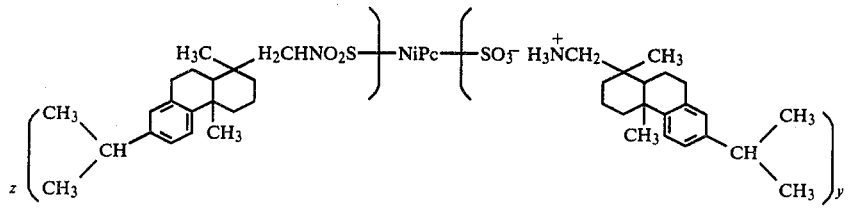

where $y+z=1.5$. A product similar to Example 7 was obtained.

EXAMPLE 9

78 parts phthalonitrile, 4.3 parts benzophenone 3,3′,4,4′-tetracarboxylic dianhydride, 22.5 parts cupric chloride, 0.8 parts molybdic acid, 40 parts urea, 300 parts Isopar M (isoparaffin ex. Esso Chemicals) and 10 parts of the phthalocyanine derivative as used in Example 2 were heated cautiously to 110° C. with stirring and held for 2 hours. The temperature was then raised to 180° C. and held for 15 hours. The product was removed by steam distillation of solvents, filtration and washing. The resultant phthalocyanine exhibited an X-ray diffraction pattern similar to the α form.

What is claimed is:

1. In a process for the preparation of a solvent-stable, red-shade copper phthalocyanine pigment composition, wherein an organic compound capable of forming the phthalocyanine ring system, a copper compound capable of providing the copper atom of the copper phthalocyanine molecule, a reaction catalyst, and a nitrogen source are reacted at an elevated temperature and in an organic solvent wherein the improvement, whereby high quality pigments are obtained in a single stage reaction without the need for acid pasting or mechanical pulverization, which consists of (a) substituting 2.5-10% by weight of the organic compound capable of forming the phthalocyanine ring system with benzophenone-3,3′,4,4′-tetracarboxylic acid or a derivative thereof; and (b) adding 0-20% by weight of the total pigment composition of a compound of the formula

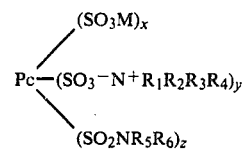

wherein Pc represents a metal - or a metal-free phthalocyanine residue, $R_1$, $R_2$, $R_3$, $R_4$, $R_5$ and $R_6$ are the same or different, and each represents a hydrogen atom, a cyclic or acyclic alkyl group, an aryl, aralkyl, alkaryl or dehydroabietyl group, M represents hydrogen, or an alkali metal atom, x, y and z are each in the range of from 0 to 4, with the proviso that the sum of x, y and z is within the range of from 1 to 4.

2. A process as claimed in claim 1 wherein Pc represents a phthalocyanine residue containing Ti, V, Cr, Fe, Co, Ni, Zn or Cu.

3. A process as claimed in claim 1 wherein alkyl, cycloalkyl, aryl, aralkyl or alkaryl groups $R_1$ to $R_6$ are optionally interrupted by O, N or S heteroatoms and are optionally substituted by hydroxyl, amino or amide groups.

4. A process as claimed in claim 1 wherein, in the compound of formula I, x has a value in the range 0 to 2, and z and y each have a value in the range 0 to 3, subject to the proviso in claim 1.

5. A process as claimed in claim 1 wherein the benzophenone derivative is benzophenone-3,3′,4,4′-tetracarboxylic acid or the dianhydride or an alkali metal salt thereof, or the -imide, -diimide, or -mono-, -di-, -tri-, or tetramide.

6. A solvent-stable, red-shade copper phthalocyanine composition when produced by the process claimed in claim 1.

* * * * *